US012263561B2

(12) United States Patent
Lin

(10) Patent No.: US 12,263,561 B2
(45) Date of Patent: Apr. 1, 2025

(54) RATCHET WRENCH

(71) Applicant: YIH CHENG FACTORY CO., LTD., Nantuo (TW)

(72) Inventor: Jack Lin, Nantuo (TW)

(73) Assignee: YIH CHENG FACTORY CO., LTD., Nantuo (TW)

( * ) Notice: Subject to any disclaimer, the term of this patent is extended or adjusted under 35 U.S.C. 154(b) by 363 days.

(21) Appl. No.: 17/941,832

(22) Filed: Sep. 9, 2022

(65) Prior Publication Data

US 2024/0082988 A1 Mar. 14, 2024

(51) Int. Cl.
*B25B 13/46* (2006.01)
*B25B 23/00* (2006.01)

(52) U.S. Cl.
CPC ........ *B25B 13/462* (2013.01); *B25B 23/0035* (2013.01)

(58) Field of Classification Search
CPC ..... B25B 13/06; B25B 13/065; B25B 13/461; B25B 13/462; B25B 13/463; B25B 13/481; B25B 23/0035
See application file for complete search history.

(56) References Cited

U.S. PATENT DOCUMENTS 4,796,492 A * 1/1989 Liou .................... B25B 13/463 81/58
5,144,869 A * 9/1992 Chow .................... B25B 13/04 81/63
6,688,195 B1 * 2/2004 Hsien .................... B25B 13/463 81/125
7,143,669 B2 * 12/2006 Hu .................... B25B 23/0035 81/177.85
7,284,464 B2 * 10/2007 Chaconas .............. B25B 13/06 81/58
8,230,766 B2 * 7/2012 Chang .................. B25B 13/461 81/177.8
8,739,659 B2 * 6/2014 Chen .................... B25B 13/463 81/63
10,286,531 B2 * 5/2019 Hu ........................ B25B 15/001
10,800,013 B2 * 10/2020 Hu ........................ B25B 13/463
D951,730 S * 5/2022 Zhang .............................. D8/28
11,325,226 B2 * 5/2022 Shih ........................ B25B 13/04
11,911,878 B2 * 2/2024 Buchanan ............. B25B 13/462
2004/0093995 A1 * 5/2004 Hu ........................ B25B 13/463 81/63.2
2007/0277652 A1 * 12/2007 Tuan-Mu ............. B25B 13/463 81/63

(Continued)

*Primary Examiner* — David B. Thomas
(74) *Attorney, Agent, or Firm* — Chun-Ming Shih; HDLS IPR SERVICES

(57) ABSTRACT

A ratchet wrench for rotating a workpiece with a top side includes a wrench body and a ratchet. The wrench body has a working end. The working end has a first end face and a second end face opposite to each other. The working end is disposed with a through hole. The ratchet is disposed in the through hole and formed with a first tool trough and a second tool trough communicating with each other. The first tool trough is arranged corresponding to the first end face and has a first blocking face. The second tool trough is arranged corresponding to the second end face and has a second blocking face. The workpiece is optionally received in the first tool trough or the second tool trough to make the top side abut against the first blocking face or the second blocking face.

9 Claims, 10 Drawing Sheets

(56) References Cited

U.S. PATENT DOCUMENTS

| | | | | |
|---|---|---|---|---|
| 2008/0307931 | A1* | 12/2008 | Cheng | B25B 13/463<br>81/60 |
| 2009/0133539 | A1* | 5/2009 | Cheng | F16B 23/003<br>81/63.1 |
| 2009/0151507 | A1* | 6/2009 | Chen | B25B 13/463<br>81/60 |
| 2014/0123817 | A1* | 5/2014 | Lin | B25G 1/063<br>81/63.1 |
| 2019/0022831 | A1* | 1/2019 | Buchanan | B25B 13/04 |
| 2019/0344406 | A1* | 11/2019 | Chen | B25B 13/463 |
| 2021/0276166 | A1* | 9/2021 | Chen | B25B 13/461 |
| 2021/0354273 | A1* | 11/2021 | Lai | B25B 23/0035 |

* cited by examiner

RATCHET WRENCH

BACKGROUND

Technical Field

The disclosure relates to a hand tool, particularly to a ratchet wrench.

Description of Related Art

Hand tools are widely applied to the fields of various industrial manufacture, especially wrenches. A wrench is usually used to loosen or tighten a bolt and nut or be installed with a tool head (flat or cross). A related-art open-end wrench needs large operating space for use. In a narrow space, the wrench must be taken off after rotating to a small angle because of the environmental limitation, and then re-grips a nut or bolt before rotating again. Thus, a ratchet wrench is developed to make users be able to continuously rotate a nut or bolt without taking off the wrench from the nut or bolt in a narrow space.

However, the fixing pit of related-art ratchet wrench for a bolt, nut or tool head is a through hole, so the bolt, nut or tool head may pass out of the ratchet wrench during the operation. The fixing pit is difficult to be fixed with a bolt, nut or tool head and it causes slippery escapes or unsmooth switches in rotation. Also, related-art ratchet wrench can only match a single-size bolt, nut or tool head, so users must prepare multiple ratchet wrenches with different sizes for future use. That may increase cost, need to find the corresponding size first, and required storage space is enormous.

In view of this, the inventors have devoted themselves to the above-mentioned related art, researched intensively and cooperated with the application of science to try to solve the above-mentioned problems. Finally, the invention which is reasonable and effective to overcome the above drawbacks is provided.

SUMMARY

An object of the disclosure is to make a ratchet wrench be capable of using forward or reversely, and a workpiece may not protrude from the working end to facilitate operating.

To accomplish the above object, the disclosure provides a ratchet wrench for rotating a workpiece with a top side, the ratchet wrench includes a wrench body and a ratchet. The wrench body has a working end. The working end has a first end face and a second end face opposite to each other. The working end is disposed with a through hole penetrating the first end face and the second end face. The ratchet is rotatably disposed in the through hole. An end face of the ratchet is formed with a first tool trough, and another end face of the ratchet is formed with a second tool trough communicating with the first tool trough. The first tool trough is arranged corresponding to the first end face and has a first blocking face. The second tool trough is arranged corresponding to the second end face and has a second blocking face. At least a part of the workpiece is optionally received in one of the first tool trough and the second tool trough to make the top side abut against the first blocking face or the second blocking face.

The disclosure further has the following functions. The first tool trough and the second tool trough may accommodate workpieces with different sizes. The workpiece abuts against the first blocking face or the second blocking face to avoid the workpiece from protruding from the working end.

The elastic binding ring disposed in the ratchet may clamp and fix the workpiece to avoid the workpiece from escaping. The fixing ring disposed in the fixing trough may clamp and fix the ratchet to avoid the ratchet from escaping. The restraint flange stops the engaging portion to initially position the ratchet.

DETAILED DESCRIPTION

Figure 1:
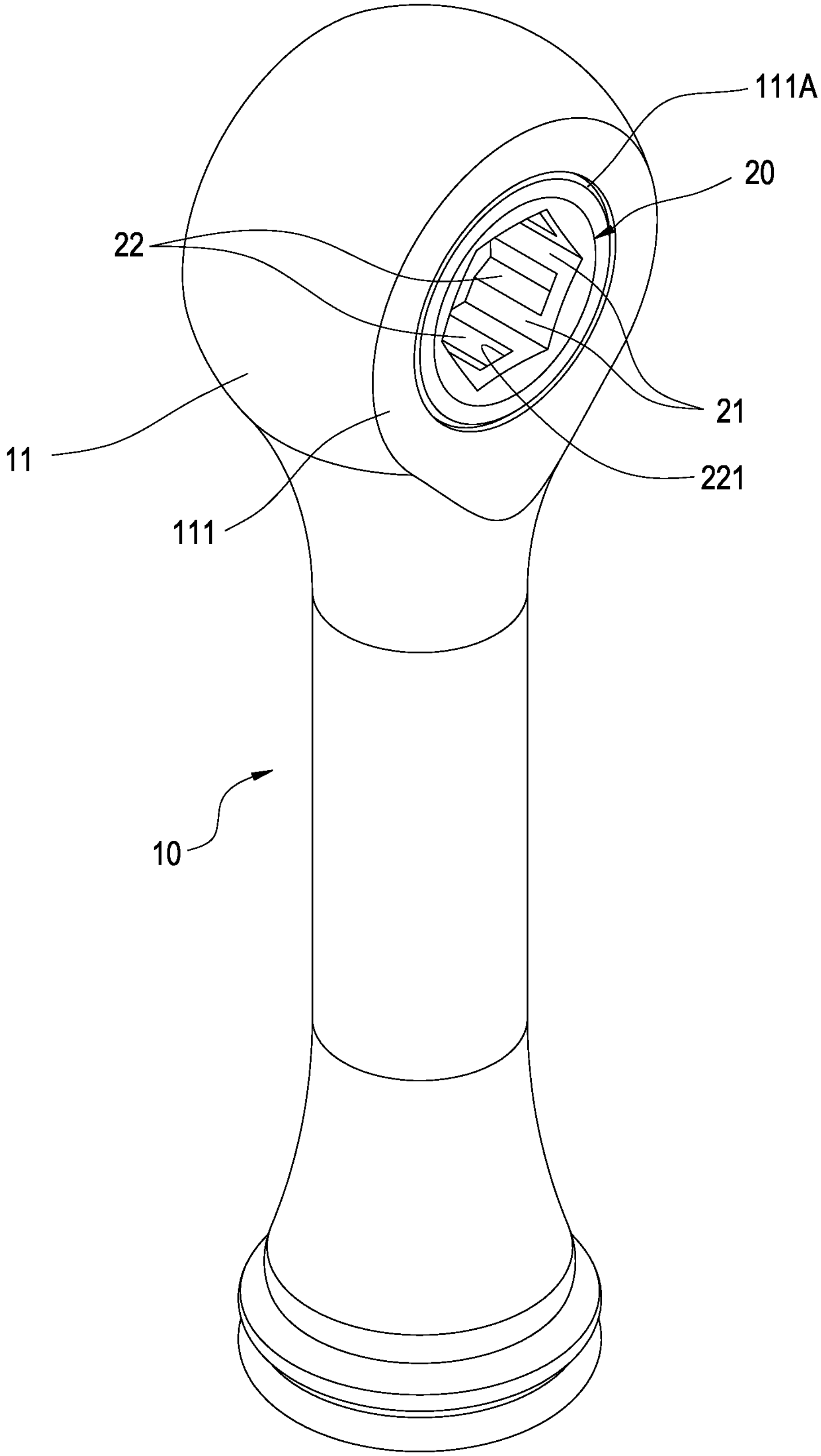
FIG. 1 is a perspective view of the disclosure.

The technical contents of this disclosure will become apparent with the detailed description of embodiments accompanied with the illustration of related drawings as follows. It is intended that the embodiments and drawings disclosed herein are to be considered illustrative rather than restrictive.

The disclosure provides a ratchet wrench for rotating a workpiece A with a top side A1. Please refer to FIGS. 1-8. The ratchet wrench includes a wrench body 10 and a ratchet 20.

The wrench body 10 has a working end 11. The working end 11 has a first end face 111 and a second end face 112, which are opposite to each other. The working end 11 is disposed with a through hole 113 penetrating the first end face 111 and the second end face 112. In the embodiment, the first end face 111 and the second end face 112 are planar surfaces. The first end face 111 and the second end face 112 are parallel to each other and perpendicular to the penetrating direction of the through hole 113, but not limited to this, for example, the first end face 111 and the second end face 112 may also be arcuate surfaces, or inclines, or the first end face 111 and the second end face 112 are planar surfaces but not perpendicular to the penetrating direction of the through hole 113.

The ratchet 20 is rotatably disposed in the through hole 113. An end face of the ratchet 20 is formed with a first tool trough 21 and the other end face of the ratchet 20 is formed with a second tool trough 22. The first tool trough 21 is arranged corresponding to the first end face 111 and has a first blocking face 211. The second tool trough 22 is arranged corresponding to the second end face 112 and has a second blocking face 221. The first tool trough 21 and the second tool trough 22 communicates with each other and are arranged in staggered manner. Also, the first tool trough 21 and the second tool trough 22 are polygonal troughs (such as angular trough, square trough, pentagonal trough, hexagonal trough, etc.). In the embodiment, the first tool trough 21 and the second tool trough 22 are, but not limited to, equilaterally hexagonal troughs. In some embodiments, the side lengths of two equilaterally hexagonal troughs of the first tool trough 21 and the second tool trough 22 are different so that the first tool trough 21 and the second tool trough 22 may be separately equipped workpieces A with different sizes, but not limited to this.

It is noted that the ratchet 20 in the embodiment is formed with the first blocking face 211 at a distal end on each corner of the hexagon of the first tool trough 21, and the ratchet 20 is formed with the second blocking face 221 at a distal end on each corner of the hexagon of the second tool trough 22, but not limited to this, for example, some corners of the first tool trough 21 or the second tool trough 22 may penetrate another end face of the ratchet 20 so as to facilitate manufacturing of the ratchet 20 to reduce the costs. That distal ends on the corners of the hexagons of the first tool trough 21 and the second tool trough 22 are separately formed with at least one first blocking face 211 and at least one second blocking face 221 is enough.

Figure 5:
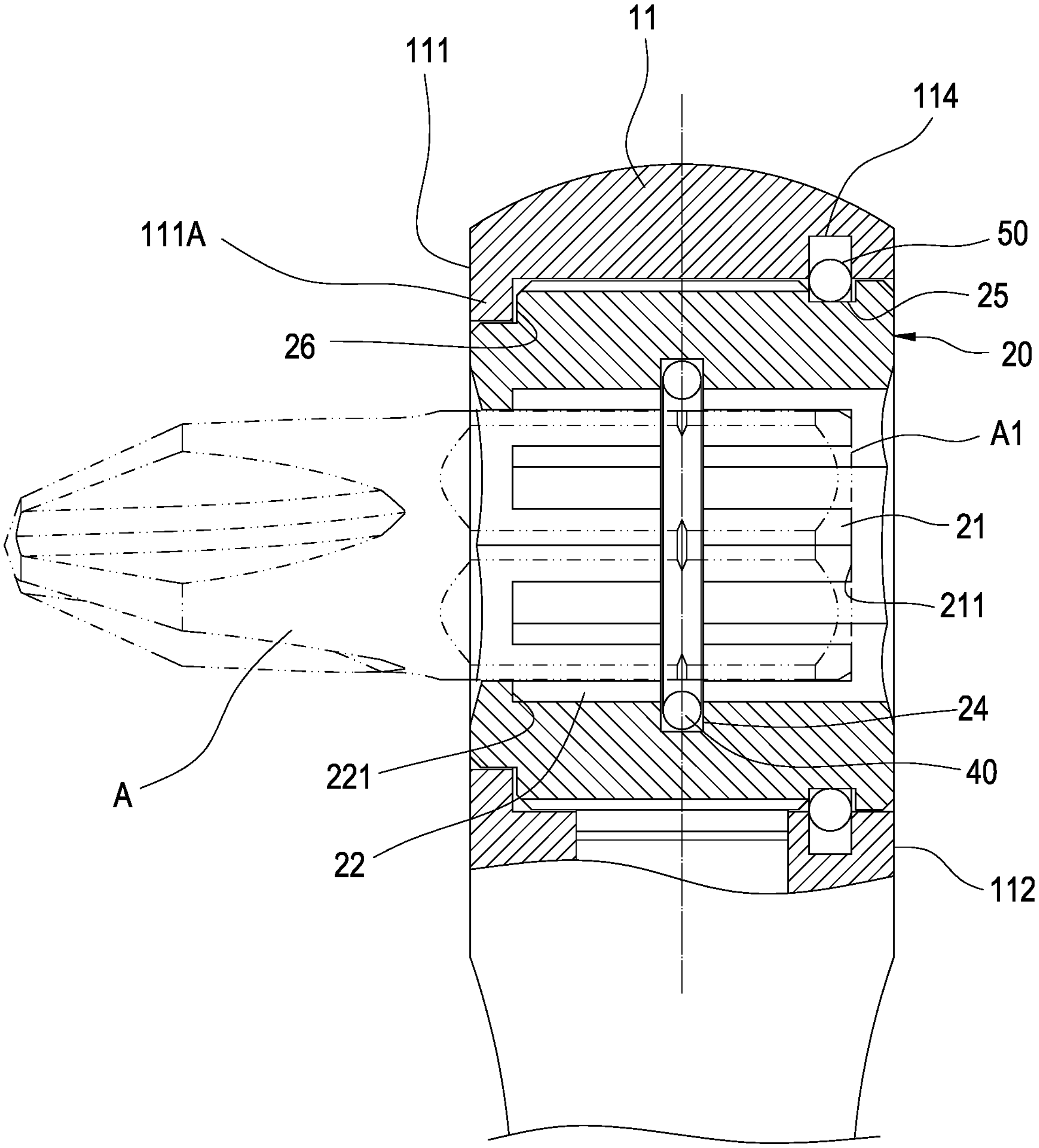
FIG. 5 is a partially schematic view of the disclosure in a using status.
Figure 6:
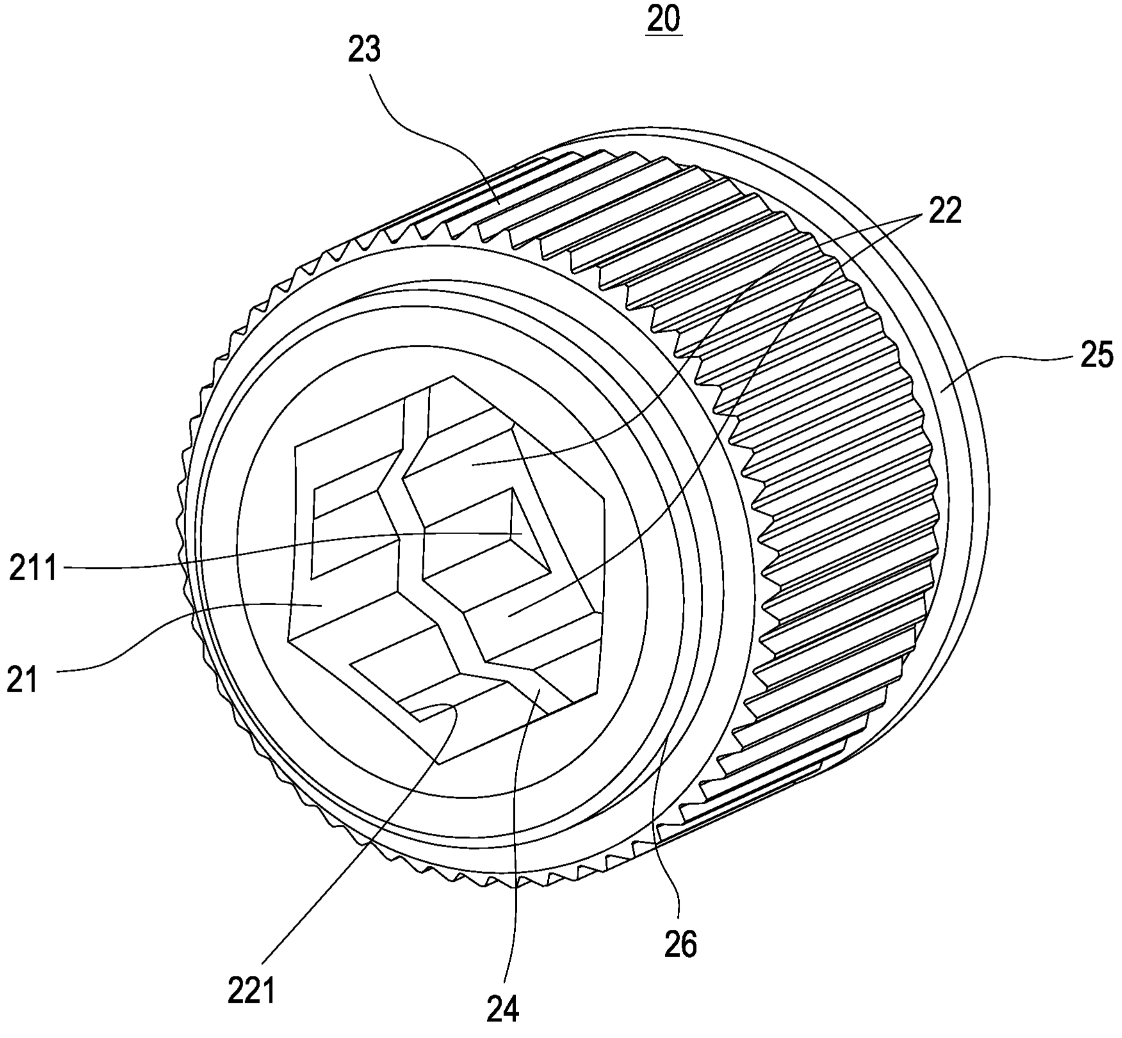
FIG. 6 is another perspective view of the ratchet of the disclosure.
Figure 7:
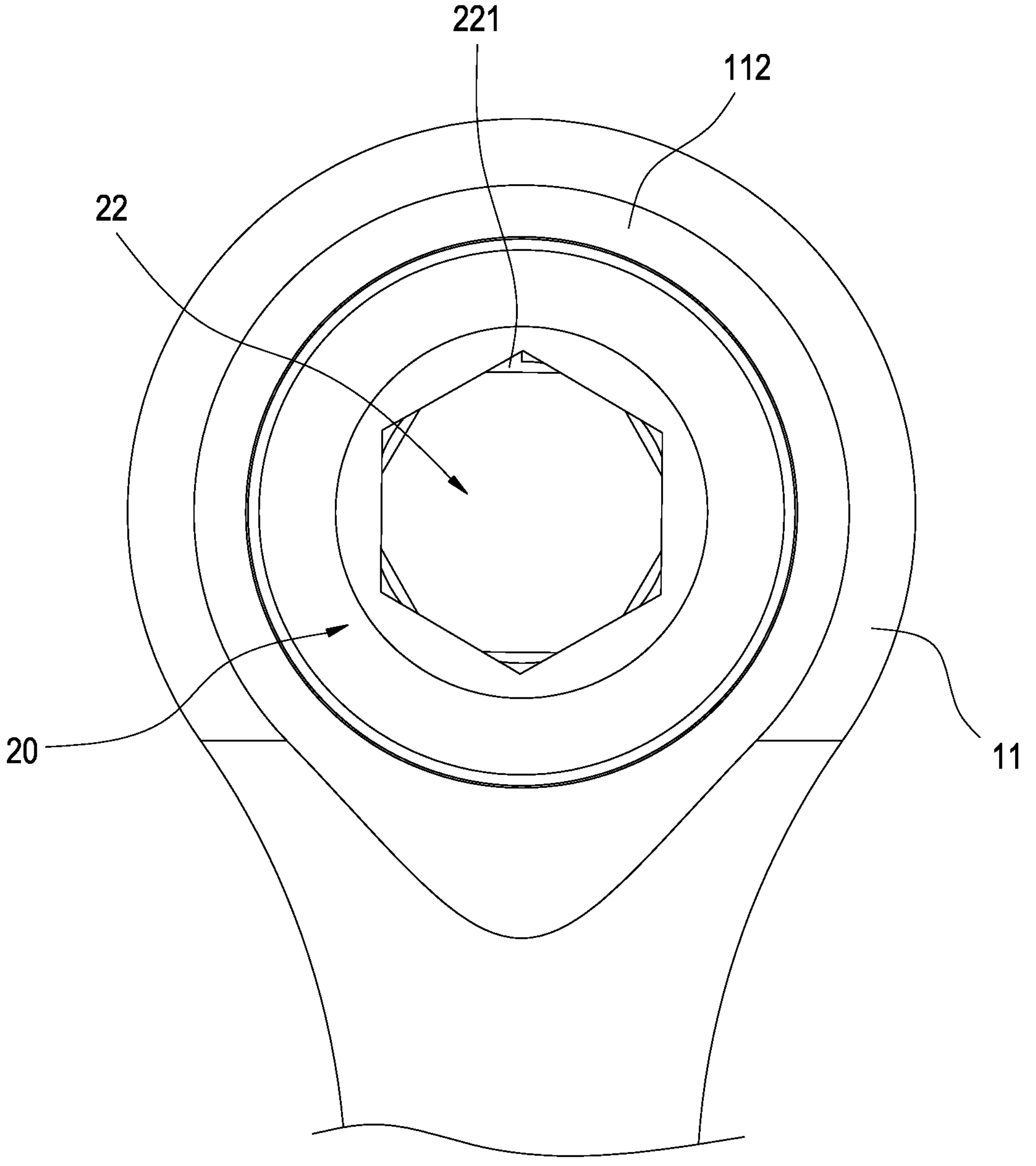
FIG. 7 is a partially front view of the second end face of the disclosure.
Figure 8:
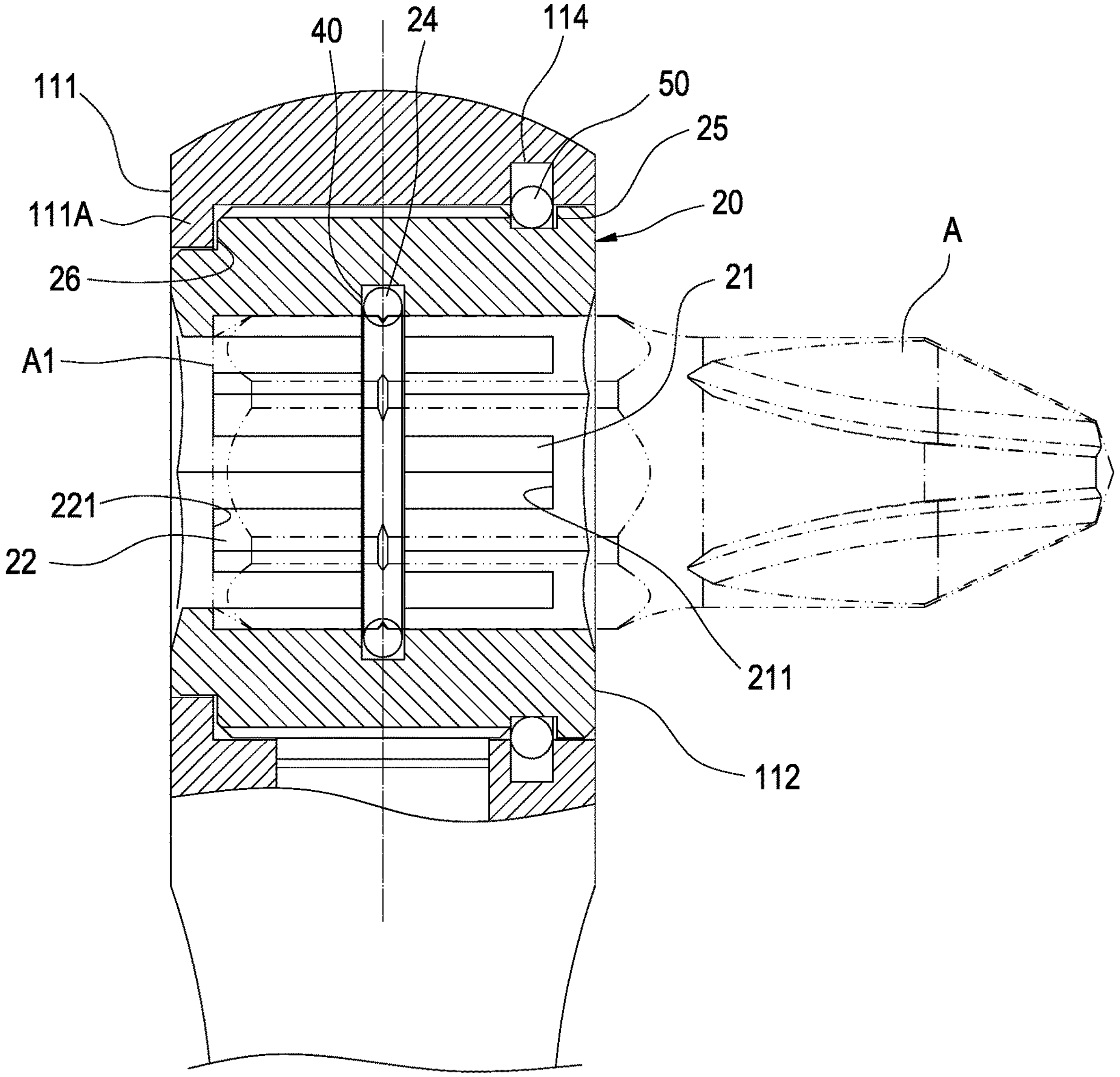
FIG. 8 is another partially schematic view of the disclosure in a using status.
Figure 9:
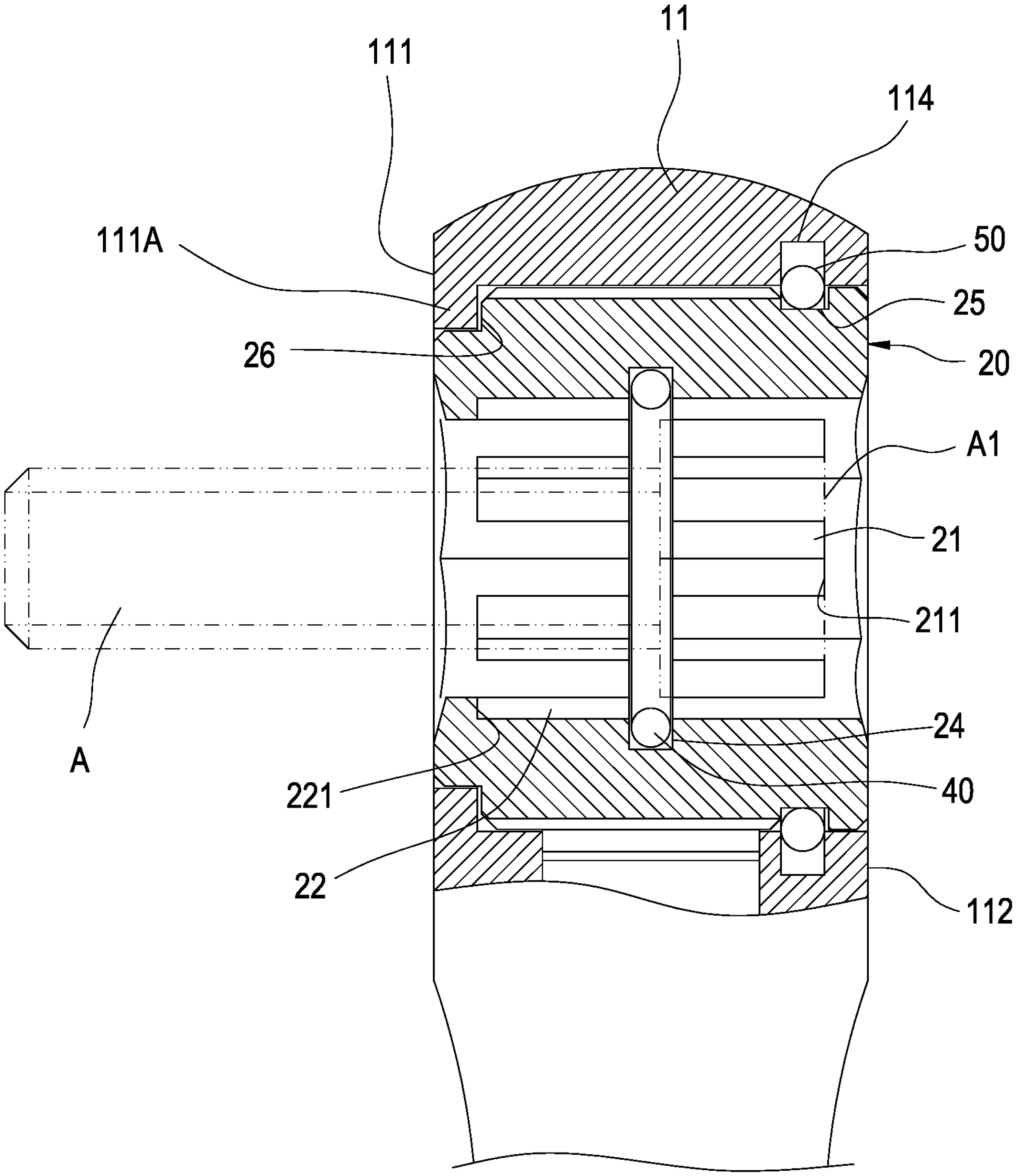
FIG. 9 is still another partially schematic view of the disclosure in a using status.

The workpiece A may be a flat tool head, a cross tool head, a bolt, a nut or other tools with polygonal peripheries. In the embodiment, the workpiece A shown in FIGS. 5 and 8 is a cross tool head and the workpiece A shown in FIG. 9 is a bolt. At least a part of the workpiece A is optionally received in one of the first tool trough 21 and the second tool trough 22 to make the top side A1 abut against the first blocking face 211 or the second blocking face 221 without penetrating out of the working end 11. Therefore, a user may select the tool depending upon different sizes of the first tool trough 21 or the second tool trough 22 to accomplish the function of a ratchet wrench being usable in double sides. Further, the workpiece A may not protrude from the working end 11 to be fixed, and may facilitate the user's operation.

Figure 2:
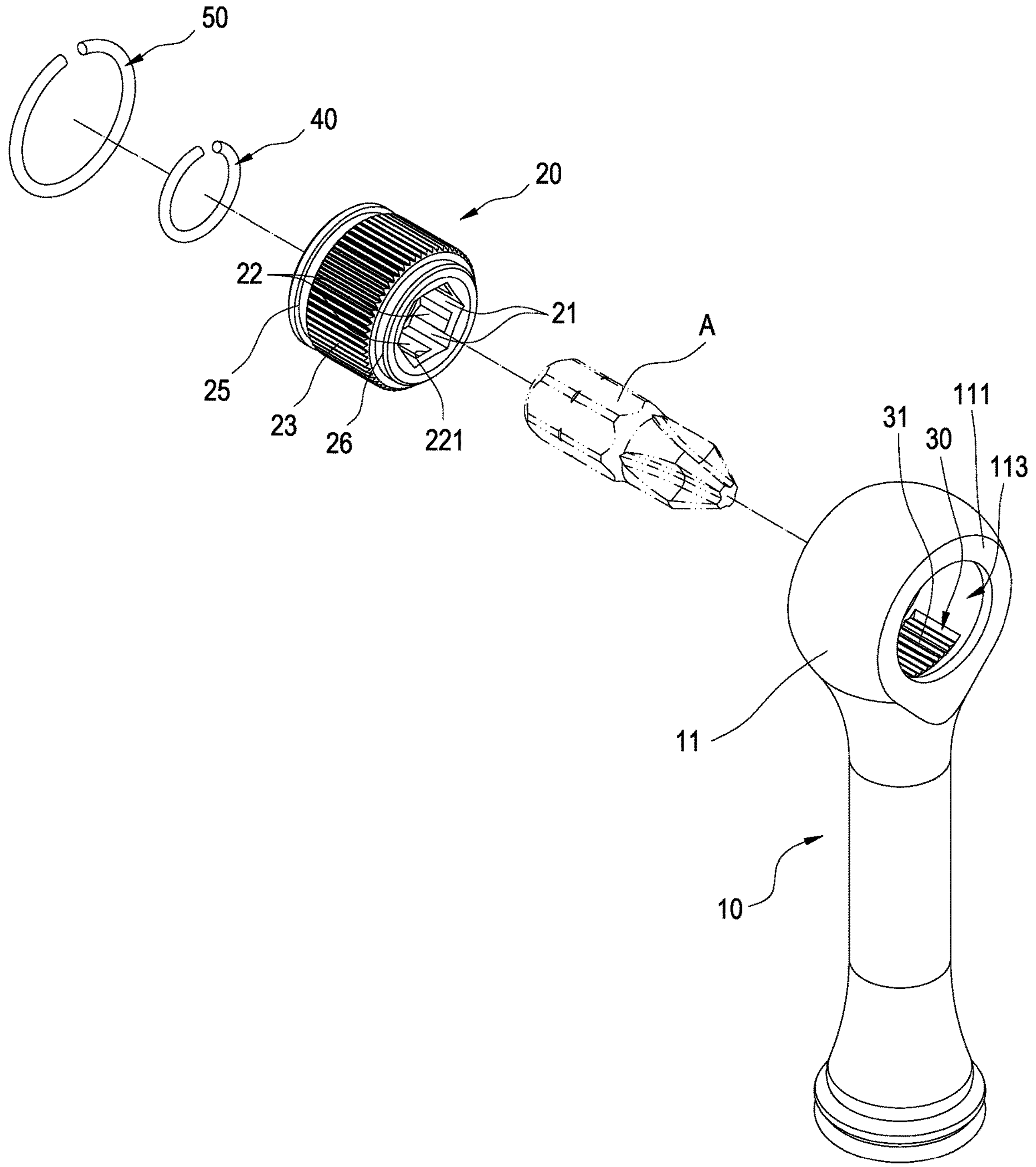
FIG. 2 is an exploded view of the disclosure.
Figure 3:
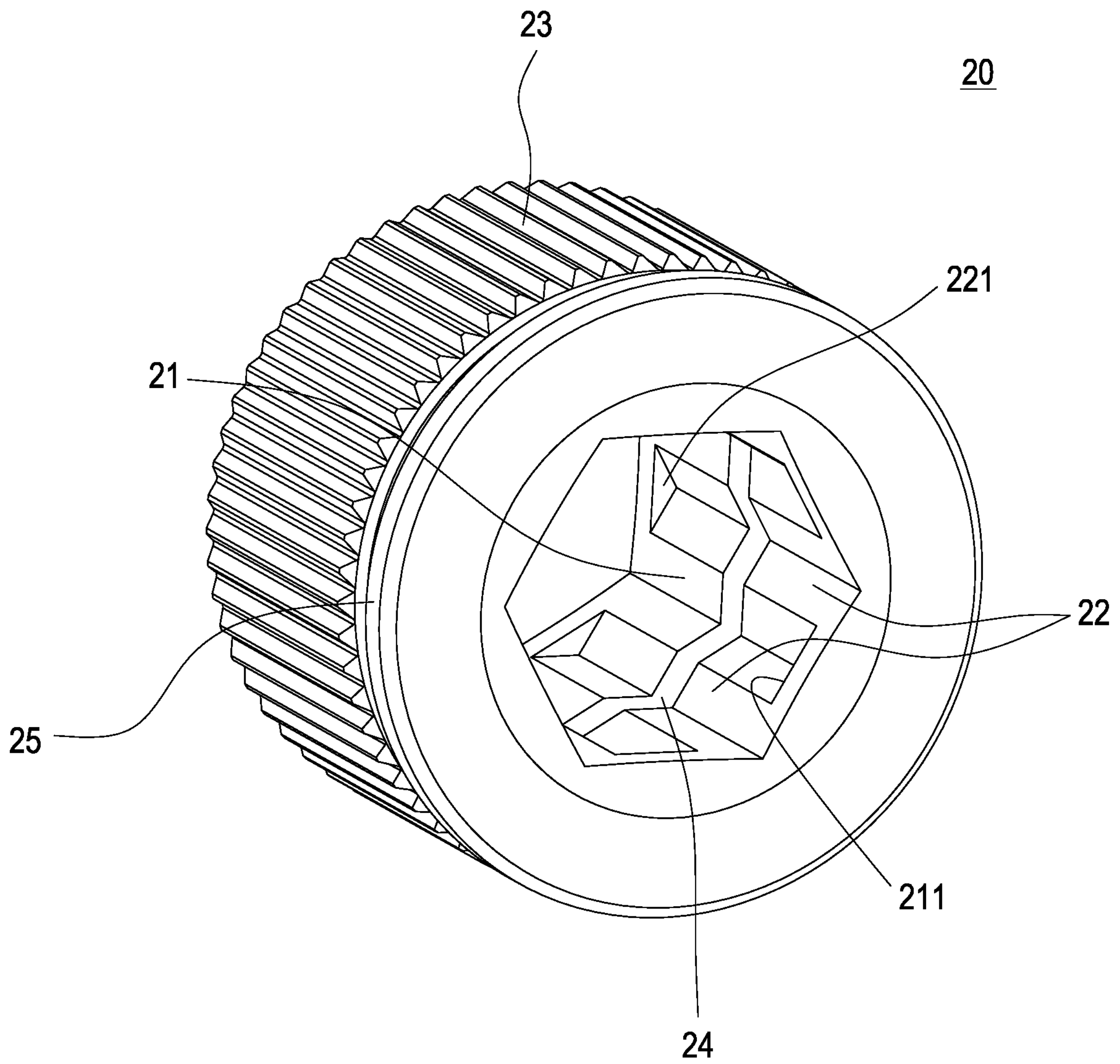
FIG. 3 is a perspective view of the ratchet of the disclosure.
Figure 4:
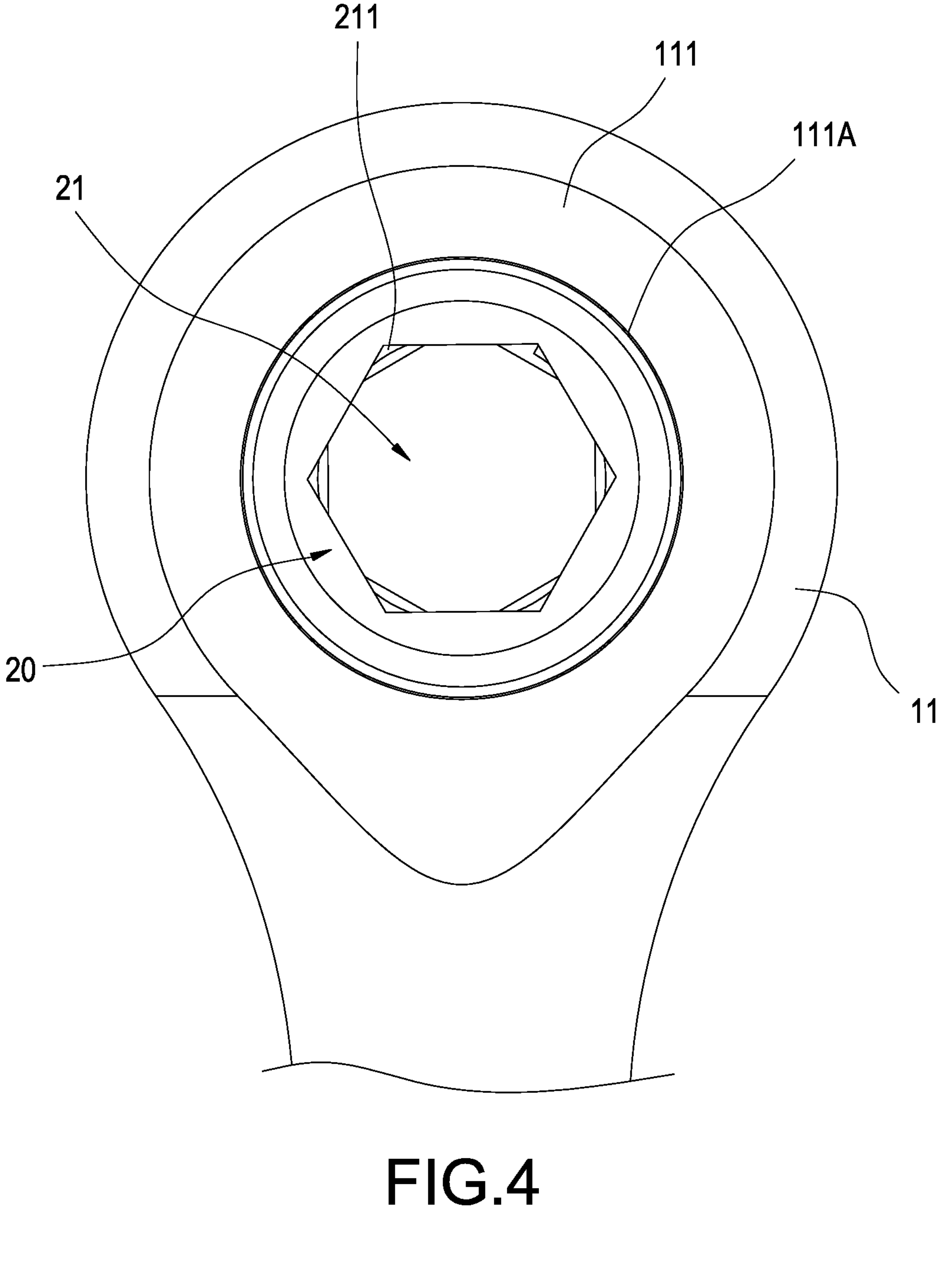
FIG. 4 is a partially front view of the first end face of the disclosure.

Please refer to FIG. 2, the ratchet wrench of the disclosure further includes an engaging block 30 and a compression spring (not shown in figures). The compression spring and the engaging block 30 are separately disposed in the working end 11 in order. A side of the engaging block 30 is exposed in the through hole 113 and the side is formed with braking teeth 31. An outer surface of the ratchet 20 is formed with outer teeth 23 corresponding to the braking teeth 31 so that the compression spring may make the engaging block 30 be unidirectionally engaged with the ratchet 20. The detailed structure and action manner may refer to Taiwan utility model patent No. M361406U.

Figure 10:
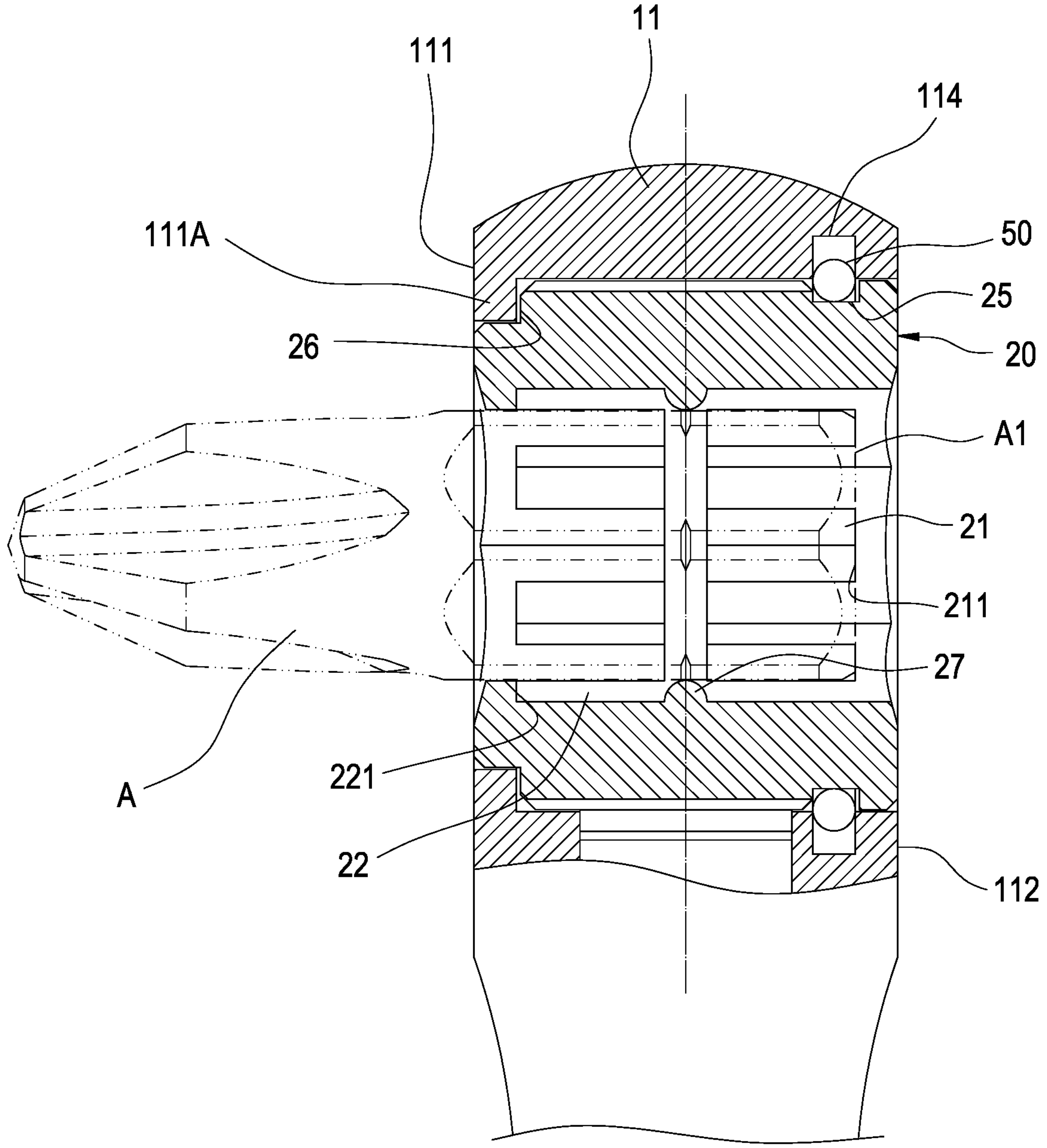
FIG. 10 is a partially schematic view of another embodiment of the disclosure in a using status.

Furthermore, please refer to FIGS. 2. 5 and 8. The ratchet wrench of the disclosure further includes an elastic binding ring 40 disposed in the ratchet 20 and elastically clamping the workpiece A. In detail, an inner surface of the ratchet 20 is formed with an annular trough 24. The elastic binding ring 40 is received in the annular trough 24 and elastically clamps the workpiece A. In the embodiment, the annular trough 24 is located between the first tool trough 21 and the second tool trough 22. The elastic binding ring 40 is, but not limited to, a standard C-ring. Therefore, the workpiece A may be clamped and fixed by the elastic binding ring 40 and free from escaping, no matter whether the workpiece A is installed in the first tool trough 21 or the second tool trough 22. In addition, please refer to FIG. 10, which shows another embodiment of the disclosure. The primary difference is an annular flange 27 formed on the inner surface of the ratchet 20. The annular flange 27 clamps and fixes the workpiece A to avoid the workpiece A from escaping. The workpiece A may be clamped and fixed by the annular flange 27 and free from escaping, no matter whether the workpiece A is installed in the first tool trough 21 or the second tool trough 22.

Also, please refer to FIGS. 2, 5 and 8. The ratchet wrench of the disclosure further includes a fixing ring 50 and an inner surface of the working end 11 is formed with a fixing trough 114 communicating with the through hole 113. The fixing ring 50 is received in the fixing trough 114 and elastically clamps the ratchet 20. In some embodiments, the outer surface of the ratchet 20 is formed with a restraint trough 25 for being embedded by the fixing ring 50. Also, the first end face 111 is formed with a restraint flange 111A extended toward the through hole 113. A side of the ratchet 20 is formed with an engaging portion 26. The restraint flange 111A is used to stop the engaging portion 26 to initially position the ratchet 20 and then the ratchet 20 is clamped and fixed by the fixing ring 50. In the embodiment, the fixing trough 114 accommodating the fixing ring 50 is adjacent to the second end face 112 to be located on a different side of the restraint flange 111A so as to position and effectively fix two sides of the ratchet 20, but not limited to this.

While this disclosure has been described by means of specific embodiments, numerous modifications and variations could be made thereto by those skilled in the art without departing from the scope and spirit of this disclosure set forth in the claims.

What is claimed is:

1. A ratchet wrench, configured to rotate a workpiece, the workpiece comprising a top side, the ratchet wrench comprising:

a wrench body, comprising a working end, the working end comprising a first end face and a second end face opposite to each other, and a through hole defined on the working end and penetrating the first end face and the second end face; and a ratchet, rotatably disposed in the through hole, the ratchet comprising a first tool trough disposed on one end face thereof and a second tool trough disposed on another end face thereof and communicating with the first tool trough, the first tool trough arranged corresponding to the first end face and comprising a first blocking face, and the second tool trough arranged corresponding to the second end face and comprising a second blocking face;

wherein the first tool trough is staggered with the second tool trough;

wherein at least a part of the workpiece is optionally received in one of the first tool trough and the second tool trough to make the top side abut against the first blocking face or the second blocking face.

2. The ratchet wrench of claim 1, wherein the first tool trough and the second tool trough are polygonal troughs with different sizes.

3. The ratchet wrench of claim 1, further comprising an elastic binding ring, wherein an annular trough is disposed on an inner surface of the ratchet, and the elastic binding ring is received in the annular trough and configured to elastically clamp the workpiece.

4. The ratchet wrench of claim 1, wherein an annular flange is disposed on an inner surface of the ratchet, and the annular flange is configured to clamp the workpiece.

5. The ratchet wrench of claim 1, further comprising a fixing ring, wherein the working end comprises a fixing trough communicating with the through hole, and the fixing ring is received in the fixing trough and configured to elastically clamp the ratchet.

6. The ratchet wrench of claim 5, wherein a restraint flange is disposed on the first end face and extended toward the through hole, the ratchet comprises an engaging portion, and the restraint flange is configured to stop the engaging portion.

7. The ratchet wrench of claim 6, wherein the fixing trough is adjacent to the second end face.

8. The ratchet wrench of claim 1, wherein the first end face and the second end face are planar surfaces, and the first end face and the second end face are parallel to each other and perpendicular to a penetrating direction of the through hole.

9. The ratchet wrench of claim 1, further comprising an engaging block, wherein the engaging block is disposed on the working end and comprises a braking tooth, and the ratchet comprises an outer tooth engaged with the braking tooth.

* * * * *